Oct. 6, 1953 P. G. CSIGI 2,654,430
ROTARY CUTTING MACHINE
Filed March 14, 1950 2 Sheets-Sheet 1

INVENTOR.
PAUL GEORGE CSIGI
BY
John J. Hanrahan
ATTORNEY

Oct. 6, 1953     P. G. CSIGI     2,654,430
ROTARY CUTTING MACHINE
Filed March 14, 1950     2 Sheets-Sheet 2
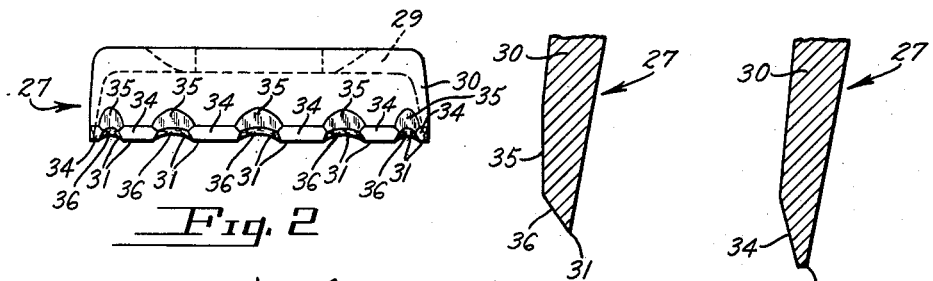
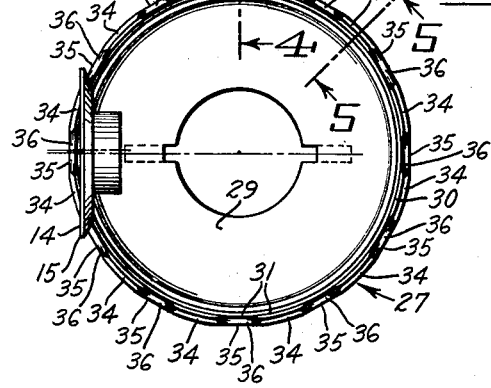
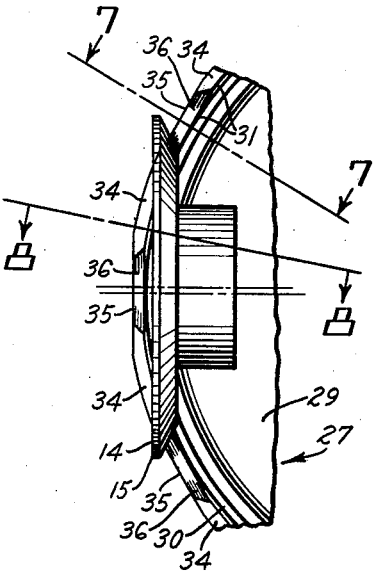
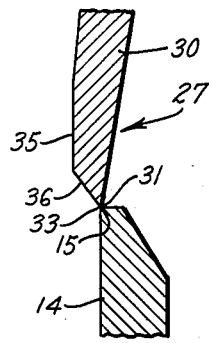
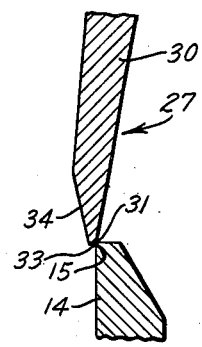
INVENTOR.
PAUL GEORGE CSIGI
BY
ATTORNEY Patented Oct. 6, 1953

2,654,430

UNITED STATES PATENT OFFICE 2,654,430

ROTARY CUTTING MACHINE

Paul George Csigi, Bridgeport, Conn., assignor, by mesne assignments, to Lico Manufacturing Co., Inc., Bridgeport, Conn., a corporation of Connecticut Application March 14, 1950, Serial No. 149,519

2 Claims. (Cl. 164—60)

This invention relates to new and useful improvements in means for trimming or cutting and has particular relation to a rotary cup-shaped cutting or trimming knife or cutter and to a machine employing the same.

An object of the invention is to provide a cup-shaped rotary knife or cutter, the edge of which is made, shaped or formed whereby it is especially adapted for the trimming or cutting of cloth re-enforced rubber.

Another object is to provide a cutting or trimming machine employing or utilizing the improved cup-shaped rotary cutter or knife whereby such machine is especially adapted for the trimming or cutting of cloth reenforced rubber articles.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 2 is a side elevational view of the cup-shaped knife or cutter of the invention;

Fig. 3 is a bottom plan view thereof in association with the cutter disc of the machine;

Fig. 4 is an enlarged detail sectional view taken as along the plane of the line 4—4 of Fig. 3;

Fig. 5 is a similar view on the same scale and taken as along the line 5—5 of Fig. 3;

Fig. 6 is an enlarged detail view showing the left hand portion of Fig. 3 enlarged;

Fig. 7 is a detail sectional view showing the portion of the cup-shaped cutter along the line 7—7 of Fig. 6 in cutting relation with the cutting disc;

Fig. 8 is a similar view but through the cup-shaped cutter portion along the line 8—8 of Fig. 6, with such portion of the cup-shaped cutter in cutting relation with the cutter disc.

Figure 1:
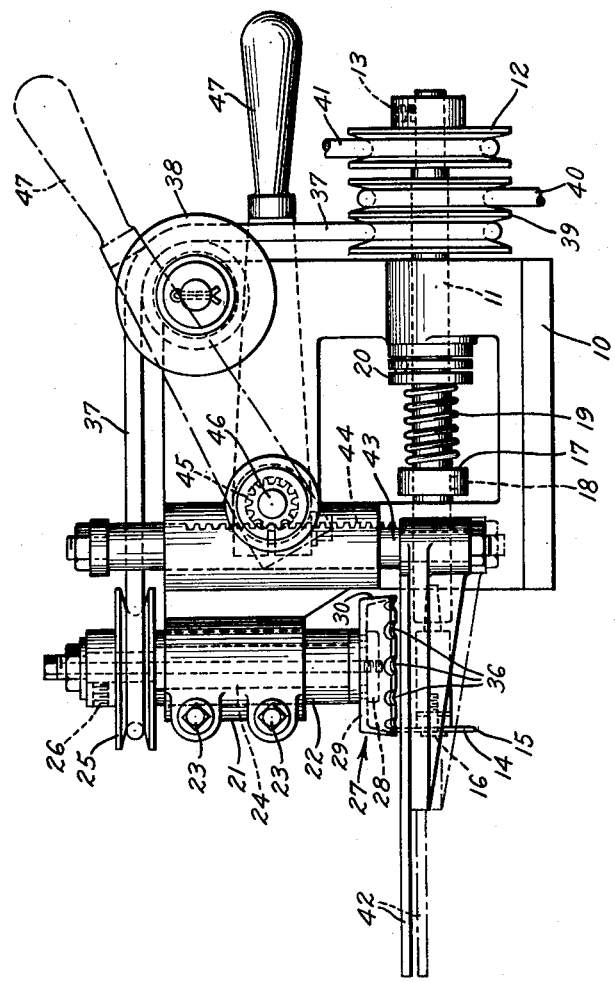
Fig. 1 is a side elevational view of the machine of the invention.

The present machine and the present cup-shaped rotary cutter or knife constitute improvements in the type of machine and cup cutter or knife disclosed in patent to Hoops, No. 1,749,882 of March 11, 1930.

Referring in detail to the drawings and at first particularly to Fig. 1, the main frame 10 of the machine carries a rotatable shaft 11 on one end of which is mounted a pulley 12, the same being suitably secured to the shaft as by means of a set screw 13. On the other end of shaft 11 is mounted a cutting disc 14, said disc being provided with a cutting edge 15. The cutting disc may be keyed or otherwise secured to the shaft 11 and is held in place thereon as by means of a nut 16.

The shaft 11 is carried in the frame 10 in a manner to permit of lengthwise movement thereof with respect to the frame as well as rotative movement about a horizontal axis. Means are provided, for a purpose hereinafter set forth, to normally maintain the shaft 11 under yielding tension so as to urge it toward the left as seen in said Fig. 1. For this purpose, a collar 17 is fixed to the shaft 11 as by means of a set screw 18 and a coil spring 19 is interposed between the collar 17 and a bearing 20, said spring being under compression. The bearing 20 may be of any suitable type, that shown herein being of the ball-bearing type to reduce friction.

The upper part of the main frame 10 is provided with a boss or sleeve-like portion 21 in which is mounted a bushing 22, the latter being held tightly in the boss on tightening of the bolts 23. Rotatably mounted within the bushing 22 is a shaft 24 on the upper end of which is mounted a pulley 25, said pulley being suitably secured to the shaft as by means of a set screw 26. On the lower end of the shaft 24 is mounted a cup-shaped cutting or trimming knife or cutter 27, the same being keyed to the shaft and secured thereon as by means of a nut 28.

The cup 27 comprises a bottom wall 29 and an annular side wall 30 and it is against such bottom wall that the nut 28 is tightened. Bottom wall 29 of the cup is substantially flat and the side wall 30 thereof is at a slight angle on its outer side reducing in diameter toward its bottom wall 29 or it may be a perfectly straight-sided cylindrical shape on its outer side. Inwardly the cup is hollow and the contour of its side wall 30 is slightly tapered or flared whereby the wall is of less thickness toward its free edge.

The actual cutting edge of the cup is indicated at 31 and the same comprises the inner periphery of the bottom edge of the cup. Disc 14 is peripherally shaped as shown to provide it with the cutting edge 15 at its outer periphery. These cutting edges contact for shearing as at 33, as best illustrated in Figs. 7 and 8.

The edge portion of the outer surface of the wall 30 of cup 27 is ground away providing a truly vertical surface portion adjacent such edge, which surface portion is indicated at 34. Then a series of circumferentially spaced concavely curved notches are formed about the outer peripheral edge portion of the cup and these may also be formed by grinding. First, flats 35 may be formed at the desired spaced points and these, as best shown in Fig. 2, extend above the ground off straight edge portions 34. Then, the portions of the edge below the flats 35 are further ground off at an incline as shown at 36 in Figs. 1 and 7.

The grinding of these notches brings about the formation of very thin edge portions which may curve slightly above the plane of the major portion of the cutting edge of the cup although as a rule the cutting edge at said notches will be in the same plane as the other portions of the cutting edge only they will be substantially thinner. Also, the notches are preferably of greatest depth measured radially of the cup at their mid-portions. Depending on the closeness of these notches to one another about the outer periphery of the cutting edge of the cup, a sinusoidal form is created.

In the assembled machine the shear points will be formed at two places. The cup 27 and the disc 15 are so mounted in the machine with respect to one another that planes passing through their cutting edges intersect in a line forming a chord of both of such cutting edges. Both the disc and the cup are rotated during use of the machine and the overlap at a point midway between their points of contact or shear points occurs. Then, as relative rotation of the elements takes place, the relationship of the parts when shearing is taking place at the mid point of one of the notches 36 is that illustrated in Fig. 7 while the relationship of the parts establishing the shear point 33 along the edges and back of the ground off portions 34 is substantially that illustrated in Fig. 8.

As will be clear, the spring 19 previously described serves to hold the cutting edge 15 of the disc 14 in contact at all times with the cutting edge 31 of the cup, the arrangement being such as to automatically take up whatever wear may occur during operation or use of the machine. In operation, the cup 27 is rotated by the pulley 25 through a belt 37 leading over carrier pulleys 38 to a double pulley 39 loosely mounted on the shaft 11. The pulley 39 may be driven by any suitable source of power as through a belt 40. The shaft 11 is also rotated and this is accomplished as by means of the pulley 12 connected to a source of power and driven as through belt 41. The cup 27 may be driven at any desired speed, although less friction and wear will result if the belt and the disc 14 are rotated at approximately the same speed.

The work to be cut or trimmed is laid on a platform 42 and is moved into contact with the cutters for trimming. It may be desirable to alter the vertical relationship or position of the platform with respect to the cutters for different portions of a piece of work or for different pieces of work in order to bring the work into correct relation with the cutters. To this end, the platform 24 is adaptable with respect to the cutters.

Thus, the full lines of Fig. 1 show the platform in one position and the broken lines show it in a second position. For the purpose of adjustment, the platform is shown as carried on an upright 43 adapted for vertical movement or movement in the direction of its length and with respect to the frame 10. The upright is shown as provided with rack teeth 44 meshing with a pinion 45 secured to a cross shaft 46 also rotatable in the main frame. One end of shaft 46 is secured to an operating lever 47 by which the shaft 46 and pinion 45 may be rotated to lower and raise the platform 42. Clearly, the work supporting platform may take other forms and may be of another relative size. It may be fixed or adjustable as illustrated or may be rotatable or otherwise, as is most desirable for different work.

Having thus set forth the nature of my invention, what I claim is:

1. In a cutting or trimming machine, in combination, a disc having a circular cutting edge lying in its outermost periphery, said disc being mounted for rotation on an axis perpendicular to a plane through said cutting edge, a cup having a circular cutting edge lying in its inner periphery, said cup being mounted for rotation on an axis perpendicular to a plane through said cutting edge, said cup and disc being so mounted with respect to each other than said planes intersect in a line which forms a chord of both circular cutting edges, and said cup having a series of circumferentially spaced concavely curved notches in its outer periphery with the walls of said notches bevelled and tapering through the cutting edge of the cup.

2. In a cutting or trimming machine, in combination, a disc having a circular cutting edge lying in its outermost periphery, said disc being mounted for rotation on an axis perpendicular to a plane through said cutting edge, a cup having a circular cutting edge lying in its inner periphery, said cup being mounted for rotation on an axis perpendicular to a plane through said cutting edge, said cup and disc being so mounted with respect to each other that the outer cutting periphery of said disc contacts with the inner cutting periphery of said cup to form a point of shear, and said cup having a series of circumferentially spaced concavely curved notches in its outer periphery with the walls of said notches bevelled and tapering substantially through the cutting edge of the cup.

PAUL GEORGE CSIGI.

References Cited in the file of this patent

UNITED STATES PATENTS

| Number | Name | Date |
| --- | --- | --- |
| 1,089,533 | Coey | Mar. 10, 1914 |
| 1,749,882 | Hoopes | Mar. 11, 1930 |
| 1,876,775 | Smith | Sept. 13, 1932 |
| 2,370,129 | Asbill | Feb. 27, 1945 |
| 2,504,957 | Baker | Apr. 25, 1950 |